US010931075B2

(12) United States Patent
Durkin (10) Patent No.: US 10,931,075 B2
(45) Date of Patent: Feb. 23, 2021

(54) APPARATUS AND METHOD FOR OPTICAL ISOLATION

(71) Applicant: SPI Lasers UK Limited, Hedge End (GB)

(72) Inventor: Michael Kevan Durkin, Bitterne Park (GB)

(73) Assignee: SPI Lasers UK Limited, Hedge End (GB)

( * ) Notice: Subject to any disclaimer, the term of this patent is extended or adjusted under 35 U.S.C. 154(b) by 283 days.

(21) Appl. No.: 16/070,128

(22) PCT Filed: Jan. 27, 2017

(86) PCT No.: PCT/GB2017/000012
§ 371 (c)(1),
(2) Date: Jul. 13, 2018

(87) PCT Pub. No.: WO2017/129939
PCT Pub. Date: Aug. 3, 2017

(65) Prior Publication Data
US 2019/0027888 A1   Jan. 24, 2019

(30) Foreign Application Priority Data

Jan. 29, 2016   (GB) .................................. 1601815.2

(51) Int. Cl.
*B23K 26/06*       (2014.01)
*H01S 3/00*        (2006.01)
(Continued)

(52) U.S. Cl.
CPC ........ *H01S 3/0064* (2013.01); *B23K 26/0648* (2013.01); *B23K 26/705* (2015.10);
(Continued)

(58) Field of Classification Search
CPC .. B23K 26/0648; B23K 26/705; B23K 26/02; B23K 26/03; B23K 26/032; B23K 26/06;
(Continued)

(56) References Cited

U.S. PATENT DOCUMENTS 6,489,985 B1   12/2002   Brodsky et al.
6,778,320 B1 *  8/2004   Traynor .................... H01S 3/30
                                                  359/334
(Continued)

FOREIGN PATENT DOCUMENTS

GB       2449525 A      11/2008
WO       02093697 A2    11/2002

*Primary Examiner* — Sang Y Paik
(74) *Attorney, Agent, or Firm* — Iandiorio Teska & Coleman, LLP (57) ABSTRACT

Apparatus for optical isolation, which apparatus comprises a laser (1), a beam delivery system (91), and an output port (92), wherein: the beam delivery system (91) comprises an optical isolator (8) and an optical fibre (2); the laser (1) is defined by a peak power (21); the laser (1) emits laser radiation (13) at a signal wavelength (19); the laser radiation (13) is coupled from the laser (1) to the output port (92) via the beam delivery system (91); and the optical fibre (2) comprises an optical waveguide (100) defined by a core (101), a cladding (102), a mode field area (104) at the signal wavelength (19), a length (86), and a Raman wavelength (25); and the apparatus being characterised in that: the Raman wavelength (25) is longer than the signal wavelength (19); the beam delivery system (91) attenuates the laser radiation (13) at the signal wavelength (19) such that the power of the laser radiation (13) emitted by the laser (1) is more than the power of the laser radiation (13) at the output port (92); the apparatus does not include a pump for pumping the laser radiation (13) at the signal wavelength (19) as the laser radiation (13) propagates along the optical fibre (2); the optical isolator (8) has greater backward optical isolation
(Continued)

(33) and greater forward transmission (28) at the signal wavelength (19) compared to the Raman wavelength (25); and the optical fibre (2) comprises a suppressing means (94) for suppressing stimulated Raman scattering.

16 Claims, 10 Drawing Sheets

(51) Int. Cl.
*H01S 3/067* (2006.01)
*B23K 26/70* (2014.01)
*H01S 3/23* (2006.01)
*H01S 3/30* (2006.01)

(52) U.S. Cl.
CPC ........ *H01S 3/06754* (2013.01); *H01S 3/2308* (2013.01); *H01S 3/302* (2013.01); *H01S 3/0078* (2013.01); *H01S 2301/03* (2013.01)

(58) Field of Classification Search
CPC .... B23K 26/062; B23K 26/0622–0626; H01S 2301/03; H01S 3/0064; H01S 3/0078; H01S 3/06754; H01S 3/10; H01S 3/10007–10023; H01S 3/2308; H01S 3/30; H01S 3/302
USPC .......................................... 219/121.6–121.86
See application file for complete search history.

(56) References Cited

U.S. PATENT DOCUMENTS

| | | | |
|---|---|---|---|
| 2003/0021302 A1 | 1/2003 | Grudinin et al. | |
| 2006/0029111 A1 | 2/2006 | Liu | |
| 2009/0080472 A1* | 3/2009 | Yao | H01S 3/06716 372/6 |
| 2011/0122902 A1* | 5/2011 | Shima | H01S 3/0675 372/27 |
| 2012/0229910 A1* | 9/2012 | Durkin | G02B 19/0014 359/641 |
| 2014/0218789 A1 | 8/2014 | Clowes et al. | |
| 2015/0117473 A1* | 4/2015 | Rockwell | H01S 3/06729 372/3 |

* cited by examiner

APPARATUS AND METHOD FOR OPTICAL ISOLATION

FIELD OF INVENTION

This invention relates to an apparatus and a method for optical isolation. The invention has particular application for laser beam delivery in optical fibre lasers, and equipment for laser processing of industrial materials.

BACKGROUND TO THE INVENTION

High power lasers have important applications in the laser processing of industrial materials. Pulsed lasers, with powers exceeding 10 kW, are used in marking, engraving, cutting, welding, and drilling applications. Continuous wave lasers with powers exceeding 1 kW are used in cutting and welding applications.

These high power lasers advantageously have optical fibre beam delivery systems for delivering the laser radiation from the laser to a work piece. Unfortunately, non-linear effects, such as Raman scattering and stimulating Raman scattering can limit the maximum output power and the length of the optical fibre beam delivery system, as well as impacting the ability of the laser to withstand back reflection from the work piece. The maximum length for some systems can be as small as 1 m to 2 m. This places serious limitations on the design of laser processing machines such as flat bed cutters, or the design of manufacturing shop floors, as well as on the architecture of the laser source itself.

There is a need for an apparatus and a method for optical isolation that avoids the aforementioned problems.

THE INVENTION

According to a non-limiting embodiment of the present invention there is provided apparatus for optical isolation, which apparatus comprises a laser, a beam delivery system, and an output port, wherein:
  the beam delivery system comprises an optical isolator and an optical fibre;
  the laser is defined by a peak power;
  the laser emits laser radiation at a signal wavelength;
  the laser radiation is coupled from the laser to the output port via the beam delivery system; and
  the optical fibre comprises an optical waveguide defined by a core, a cladding, a mode field area at the signal wavelength, a length, and a Raman wavelength;
  and the apparatus being characterised in that:
  the Raman wavelength is longer than the signal wavelength;
  the beam delivery system attenuates the laser radiation at the signal wavelength such that the power of the laser radiation emitted by the laser is more than the power of the laser radiation at the output port;
  the apparatus does not include a pump for pumping the laser radiation at the signal wavelength as the laser radiation propagates along the optical fibre;
  the optical isolator has greater backward optical isolation and greater forward transmission at the signal wavelength compared to the Raman wavelength; and
  the optical fibre comprises a suppressing means for suppressing stimulated Raman scattering.

The invention is particularly useful for suppressing the effects of stimulated Raman scattering in pulsed lasers. This is because the pulse shape can often be of prime importance, and if back reflected optical radiation at the Raman wavelength overlaps temporally or spatially the forward going pulse in either the beam delivery system or the laser, the pulse shape can be materially affected. Stimulated Raman scattering can also lead to radiation that has been scattered at the Raman wavelength which is then reflected back towards the laser. This radiation can be amplified further and can damage the laser.

"Forward" refers to propagation of optical radiation away from the laser, and "backward" refers to propagation of optical radiation towards the laser.

The present invention is different from known systems that use Raman amplification by which optical radiation propagating along an optical fibre is pumped by pump radiation that has a wavelength shorter than the signal wavelength of the optical radiation. In such systems, the Raman wavelength generated by the pump radiation is approximately equal to the signal wavelength, and the resulting Raman gain amplifies the optical radiation, increasing its power as it propagates along the optical fibre. However in the present invention, the laser is such that the peak power of the optical radiation at the signal wavelength is so high that the optical radiation generates undesirable spontaneous emission at the Raman wavelength, which wavelength is longer than the signal wavelength. The optical radiation may pump this spontaneous emission via stimulated Raman scattering. Such processes deplete the optical radiation propagating along the fibre, and may result in backward propagating light of such intensity that it can damage optical components in the apparatus such as isolators, pump diodes, and seed lasers. In the present invention, there is no pump, and the optical fibre propagates optical radiation other than optical radiation that can amplify the laser radiation at the signal wavelength via stimulated Raman scattering.

The optical fibre may have substantially less stimulated Raman scattering gain at the peak power than a fibre that has the same mode field diameter but does not have the suppressing means. The suppressing means may be a filter that preferentially absorbs, scatters, couples or otherwise removes optical radiation at the Raman wavelength from the core of the optical fibre in preference to the optical radiation at the signal wavelength.

The suppressing means may be distributed over the length of the optical fibre.

The suppressing means may comprise high index features which surround the core and which are configured to increase coupling of light into leaky modes at the Raman wavelength compared to coupling of light into leaky modes at the signal wavelength.

The suppressing means may comprise at least one blazed grating. The blazed grating is preferably a fibre Bragg grating in which the grating lines are at an angle with respect to the axis of the fibre. A blazed grating reflects or couples unwanted light out of the core of the fibre.

The suppressing means may comprise at least one long-period grating.

The suppressing means may comprise a depressed refractive index cladding surrounding the core.

The optical isolator may be located between the laser and the optical fibre. This is a particularly advantageous aspect of the invention because it enables the optical isolator to be housed within or near the laser chassis, rather than near laser scanning heads within laser processing machines. It is consequently easier to provide cooling, and the output optic design can be smaller and less cumbersome.

The optical fibre may be located between the laser and the optical isolator.

The length of the optical fibre may be greater than a critical length equal to the quotient of 16 times the mode field area and the product of Raman gain coefficient of the optical fibre and the peak power. The length may be greater than 1.5 times the critical length. The length may be greater than 2 times the critical length. The length may be greater than 5 times the critical length. The length may be greater than 10 times the critical length. The peak power may be greater than 10 kW, and the length may be greater than ten meters. Advantageously, the invention permits optical fibres that are longer than the critical length to be used in laser systems without being affected by stimulated Raman scattering.

The apparatus may be configured such that an output end of the optical fibre is a distance d from a work piece. The laser may be such that it emits a pulse having a spatial pulse length in vacuum greater than 2 d. Advantageously, the suppressing means permits the reflected optical radiation to overlap the forward going radiation without the distortion or destabilising effects caused by stimulated Raman scattering. The pulse width may be at least 100 ps. The pulse width may be at least 1 ns.

The laser may be configured to emit a pulse that has a spatial length in the optical fibre of between two times and ten times the length of the optical fibre. The spatial length may be less than five times the length of the optical fibre. A pulse that has a spatial length of at least 2 L will overlap along the length of the optical fibre completely at least once during a reflection from the fibre end. In practice the effects of pulse distortion caused by overlapping pulses becomes important for pulses having spatial pulse lengths up to approximately 10 L The laser may emit a pulse that has a spatial pulse length less than 10 L, preferably less than 5 L, and more preferably less than 2 L. Advantageously, the suppressing means permits the reflected optical radiation to overlap the forward going radiation without the distortion or destabilising effects caused by stimulated Raman scattering.

The laser may be able to emit a pulse having a pulse width less than or equal to 2 μs. The pulse width may be less than or equal to 500 ns. The pulse width may be less than or equal to 100 ns. The pulse width may be less than or equal to 25 ns.

The laser may be configured to emit a plurality of pulses, and the spatial separation in the optical fibre between adjacent pulses may be less than or equal to twice the length of the optical fibre. Advantageously, the suppressing means permits such pulses to overlap without the distortion or destabilising effects caused by stimulated Raman scattering. The laser may have a pulse repetition frequency of at least 1 MHz, preferably at least 5 MHz, and more preferably at least 20 MHz.

The laser may be a ytterbium-doped fibre laser defined by a beam quality $M^2$ factor less than 2 and a peak power greater than 10 kW. The laser is preferably configured as a master oscillator power amplifier.

The apparatus may include an objective lens configured to focus the optical radiation onto a work piece, the apparatus being in the form of an apparatus for the industrial processing of materials. Such industrial processing may include cutting, welding, marking, engraving, scribing, cleaning, drilling, cladding, or additive manufacturing. In such an apparatus, the forward going optical radiation provided by the laser is often partially reflected by the work piece. If the forward going optical radiation also includes a component at the Raman wavelength, then the effect of the reflected radiation either at the signal wavelength or the Raman wavelength is to remove signal radiation from the forward going laser radiation resulting in the pulse shape having a distortion at the work piece. The reflected radiation may also cause damage to the laser or the beam delivery system.

The invention also provides a method for optical isolation, which method comprises providing a laser, a beam delivery system, and an output port, wherein:
  the beam delivery system comprises an optical isolator and an optical fibre;
  the laser is defined by a peak power;
  the laser emits laser radiation at a signal wavelength;
  coupling the laser radiation from the laser to the output port is via the beam delivery system; and
  the optical fibre comprises an optical waveguide defined by a core, a cladding, a mode field area at the signal wavelength, a length, and a Raman wavelength;
  the method being characterised in that
  the Raman wavelength is longer than the signal wavelength;
  the beam delivery system attenuates the laser radiation at the signal wavelength such that the power of the laser radiation emitted by the laser is more than the power of the laser radiation at the output port;
  the apparatus does not include a pump for pumping the laser radiation at the signal wavelength as the laser radiation propagates along the optical fibre;
  the optical isolator has greater backward optical isolation and greater forward transmission at the signal wavelength compared to the Raman wavelength; and
  the optical fibre comprises a suppressing means for suppressing stimulated Raman scattering.

Use of an optical fibre containing a suppressing means in the apparatus and the method of the invention provides important advantages in the design of pulsed and continuous wave lasers, in that either or both of the length of the optical fibre and the peak power can be substantially increased, without risking signal distortions, signal instabilities, or catastrophic damage to the laser resulting from stimulated Raman scattering. In addition, the use of the suppressing means permits the optical isolator to be located in the laser chassis itself, rather than at the end of the beam delivery system, which is advantageous in high power laser systems in which the optical isolator requires cooling.

By pulsed or continuous wave lasers, it is meant to include quasi-continuous wave lasers, mode-locked lasers, lasers that have pulses superimposed on a continuous wave signal, and lasers that output any other type of waveform. By peak power, it is meant the maximum power emitted by the laser.

BRIEF DESCRIPTION OF THE DRAWINGS

Embodiments of the invention will now be described solely by way of example and with reference to the accompanying drawings in which.

DETAILED DESCRIPTION OF PREFERRED EMBODIMENTS OF THE INVENTION

Figure 1:
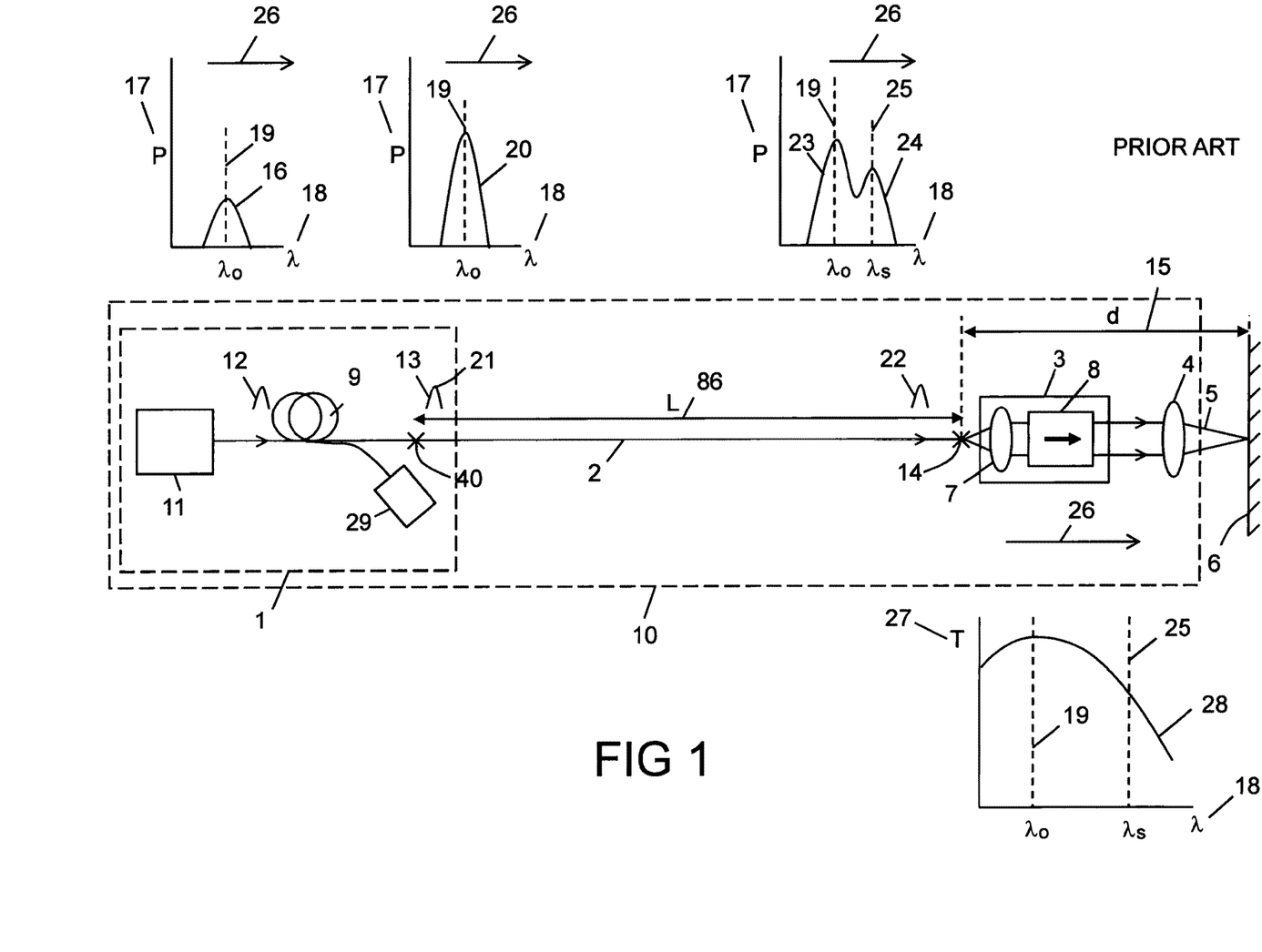
FIG. 1 shows evolution of Raman scattering in the forward direction in an apparatus not according to the present invention.

FIG. 1 shows a prior art laser system 10 comprising a laser 1, a beam delivery optical fibre 2, an output optic 3, and an objective lens 4 for focussing laser radiation 5 onto a work piece 6. The output optic 3 comprises a lens 7 and an optical isolator 8. The lens 7 focuses the laser radiation 5 through the optical isolator 8. In FIG. 1, the laser 1 comprises an amplifying fibre 9 which is pumped by a pump 29. A seed laser 11 emits seeding radiation 12 which is amplified by the amplifying fibre 9 to provide a laser signal 13. The laser signal 13 is transmitted through the optical fibre 2, and focussed onto the work piece 6 via the output optic 3 and the objective lens 4. The lens 7 and the objective lens 4 are selected and located to optimise the focussing of the laser radiation 5 from an output end 14 of the optical fibre 2 to the work piece 6, located a distance 15 from the end 14. The optical fibre 2 has a length 86.

The spectrum 16 of the seeding radiation 12 emitted by the seed laser 11 in the forward direction 26 (away from the laser 1) is defined as the optical power spectral density 17 as a function of wavelength 18. The spectrum 16 is shown centred around the signal wavelength 19. The spectrum 20 of the laser signal 13 is also shown centred around the signal wavelength 19.

The laser signal 13 is characterised by a peak power 21. If the peak power 21 is sufficiently high, then the spectrum 23 of the laser signal 22 at the output end 14 of the optical fibre 2 will have a Raman component 24 at the Raman wavelength 25. The Raman wavelength 25 is equal to the signal wavelength 19 plus the Raman shift. The Raman wavelength 25 is longer than the signal wavelength 19. The Raman shift is normally defined in frequency, but for the purposes of this discussion can be considered to be a fixed wavelength shift that is dependent upon both the signal wavelength 19 and the material properties of the optical fibre 2.

The transmission spectrum 28 through the optical isolator 8 is defined as the transmission 27 as a function of the wavelength 18. The optical isolator 8 is preferably optimized for operation at the signal wavelength 19. The transmission 27 at the signal wavelength 19 is preferably higher than the transmission at the Raman wavelength 25, which transmission is generally not zero. This is because if the output optic 3 includes the optical isolator 8, as in the system shown in FIG. 1, the optical isolator 8 would be optimized for transmission at the signal wavelength 19.

Figure 2:
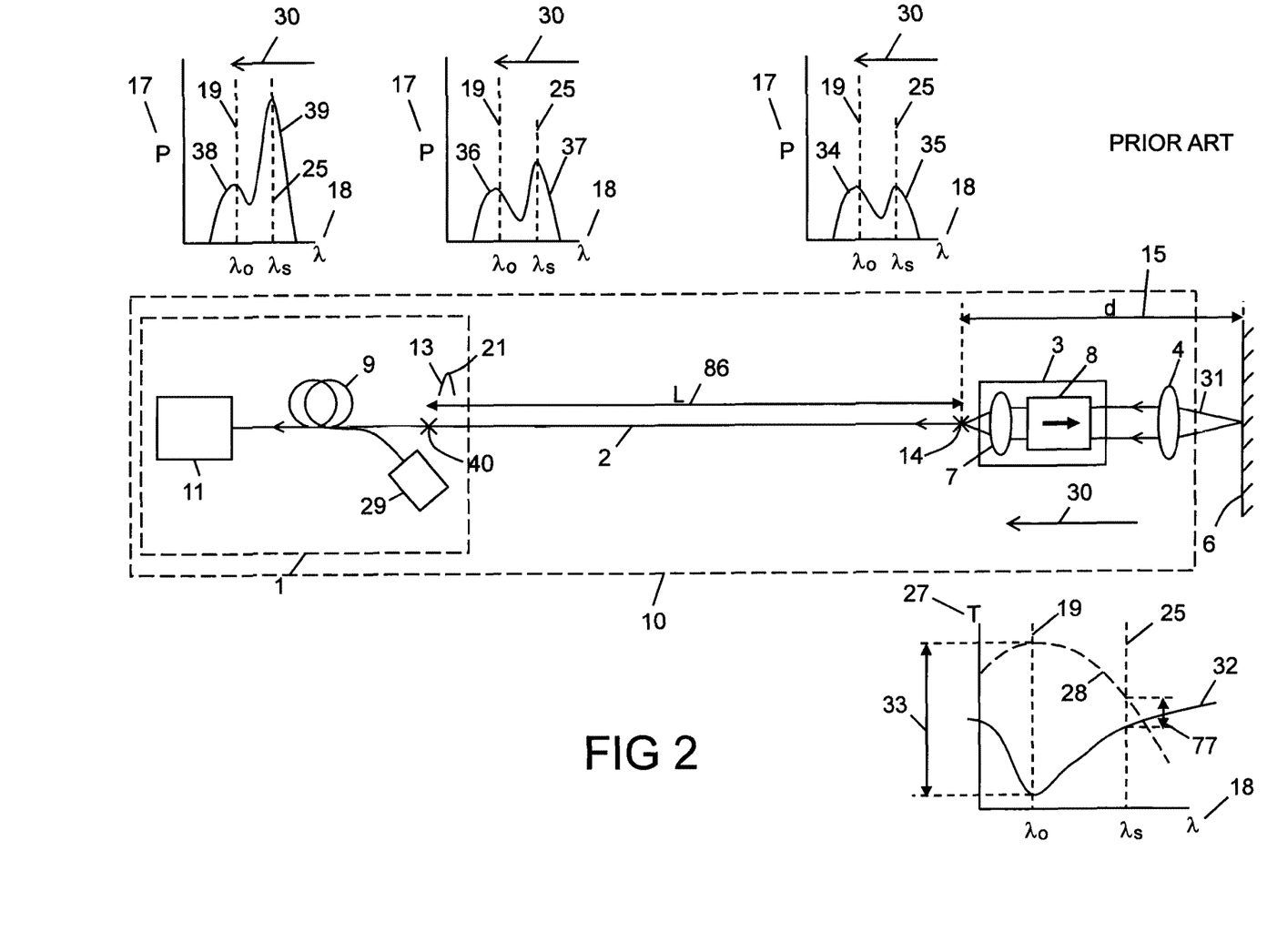
FIG. 2 shows evolution of stimulated Raman scattering in the reverse direction in the apparatus of FIG. 1.

FIG. 2 shows the operation of the prior art laser system 10 for reflected laser radiation 31 which propagates in the reverse direction 30, that is from the output end 14, along the optical fibre 2, towards the laser 1. Although the reflected laser radiation 31 is shown originating from the work piece 6, it will in general originate from many specular and other sources within the laser system 10. Comparing FIGS. 1 and 2, the transmission spectrum 32 of the optical isolator 8 has a lower transmission at the signal wavelength 19 in the reverse direction 30 than in the forward direction 26. This difference is defined as the optical isolation 33 of the optical isolator 8 at the signal wavelength 19. Generally it is important to maximise the optical isolation 33 to help reduce undesired reflections at the signal wavelength 19 propagating through the optical fibre 2 to the amplifying fibre 9, being amplified, and destabilizing the laser system 10. For this reason, the optical isolation 77 at the Raman wavelength 25 is in general smaller than the optical isolation 33 at the signal wavelength 19. This has the effect of allowing light at the Raman wavelength 25 to pass through the optical output optic 3 and to be coupled into the optical fibre 2.

As the peak power 21 of the laser signal 13 increases, so will the Raman component 24 of the spectrum 23 at the output end 14 in the forward direction 26 shown in FIG. 1, and hence the Raman component 35 of the optical spectrum 34 at the output end 14 in the reverse direction 30 shown in FIG. 2. If the laser signal 13 is propagating along the optical fibre 2 in the forward direction 26 at the same time as the reflected laser radiation 31 is propagating along the optical fibre 2 in the reverse direction 30, the forward and backward travelling optical radiation 5, 31 will overlap spatially in the optical fibre 2. The reflected laser radiation 31 will experience stimulated Raman scattering, which will amplify the Raman component 35. The spectrum 36 of the reflected laser radiation 31 will therefore have a larger Raman component 37 at the input end 40 of the fibre 2 than the Raman component 35 at the output end 14 of the fibre 2. This Raman component 37 will be further amplified by the amplifying fibre 9 (through at least one of stimulated Raman scattering or conventional linear amplification processes) which will produce an even larger Raman component 39 in the optical spectrum 38 for reflected laser radiation 31 returning to the seed laser 11. This amplified stimulated Raman component 39 may be sufficiently high to damage the seed laser 11. In addition, the stimulated Raman scattering process takes energy from the forward going laser radiation 5 as this is used as the pump for the stimulated Raman scattering process.

Figure 3:
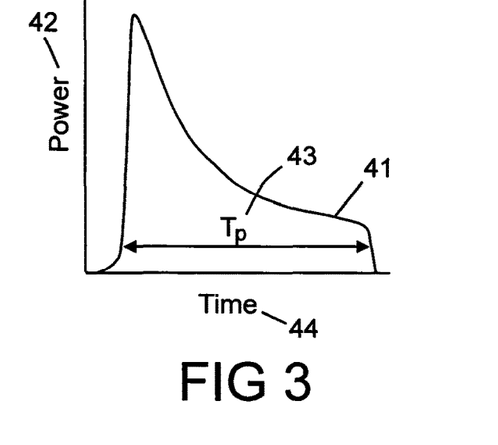
FIG. 3 shows a desired pulses shape.
Figure 4:
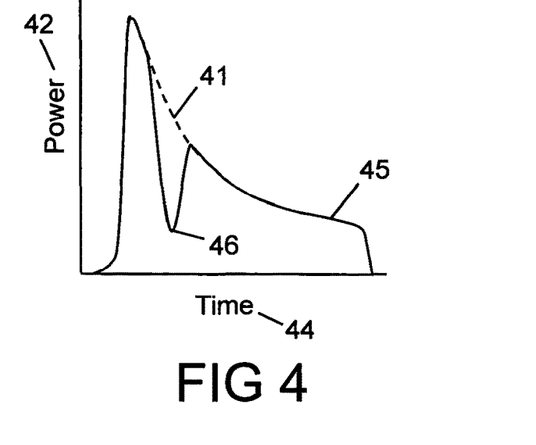
FIG. 4 shows distortion of the desired pulse shape in the apparatus of FIG. 1.

FIG. 3 shows a desired pulse shape 41 shown as the variation of optical power 42 with time 44. The pulse shape 41 has a pulse width 43. If the peak power 21 of the laser signal 13 is sufficiently high to induce stimulated Raman scattering in the optical fibre 2, then energy is taken out of the forward going laser radiation 5 and the pulse will be distorted as shown in FIG. 4. Here the pulse shape 45 has a distortion 46 caused by forward going laser radiation 5 that has pumped, and therefore lost energy to, the reflected laser radiation 31. Such a distortion 46 is very difficult to model and compensate for owing to the fact that stimulated Raman scattering is a non-linear optical process.

Figure 5:
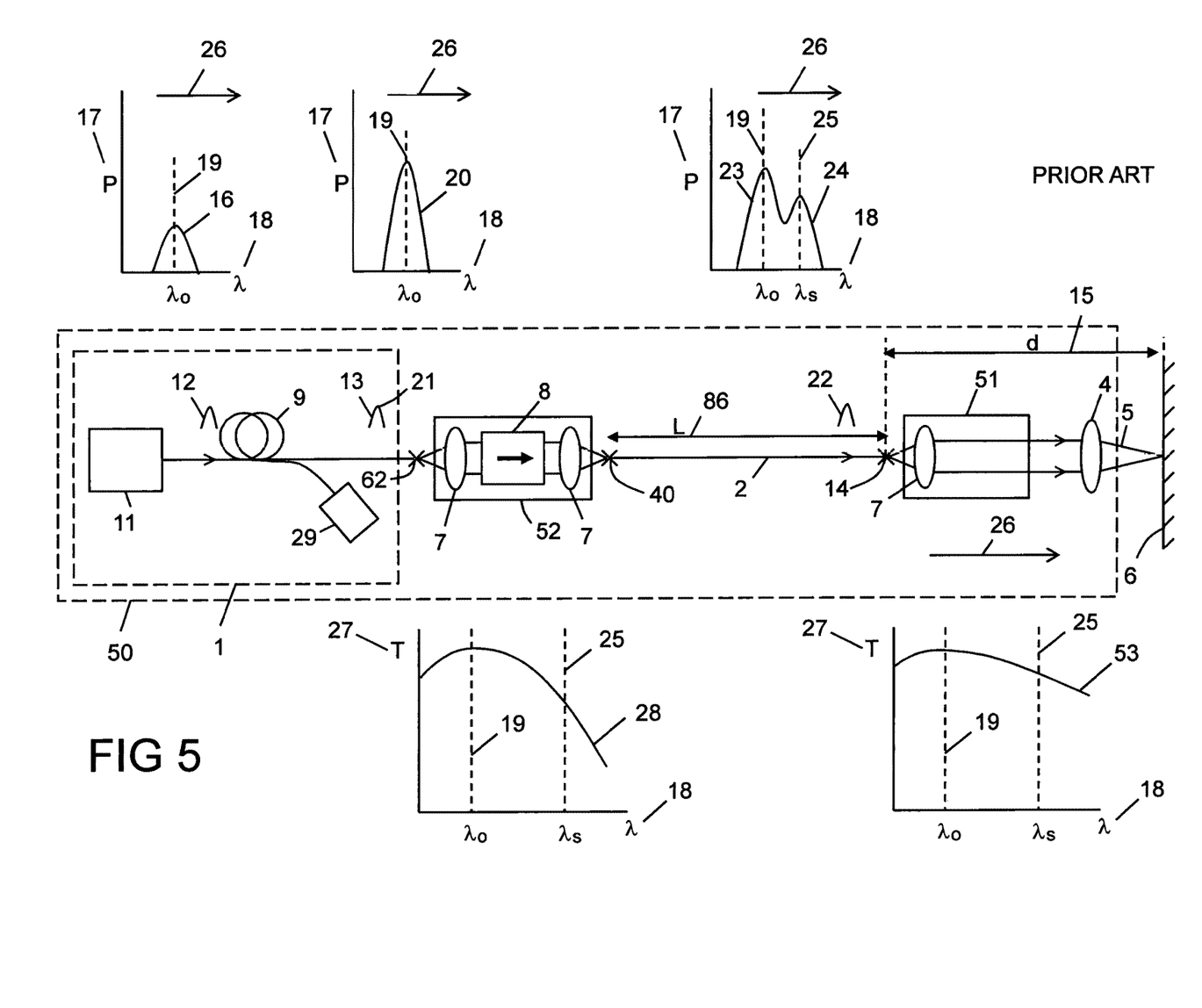
FIG. 5 shows evolution of Raman scattering in the forward direction in an apparatus not according to the present invention and in which the optical isolator is located between the laser and an optical fibre.

FIG. 5 shows the operation of a laser system 50 which is similar to the laser system 10. In the laser system 50, the optical isolator 8 is located between the laser 1 and the optical fibre 2. The output optic 51 is different from the output optic 3 of FIG. 1 in that it does not contain an isolator. The optical isolator 8 is housed in a housing 52 that includes a lens 7 that collimates light through the optical isolator 8 and another lens 7 that launches light into the optical fibre 2. The housing 52 may be located with the chassis (not shown) of the laser 1. The transmission spectrum 53 of the output optic 51 preferably includes some attenuation at the Raman wavelength 25 compared to the signal wavelength 19 induced by filters or coatings (such as anti-reflection coatings). Similarly as for the laser system 10 shown with reference to FIGS. 1 and 2, if the peak power 21 in the laser system 50 is sufficiently high, the optical spectrum 23 will contain a Raman component 24 at the Raman wavelength 25.

Figure 6:
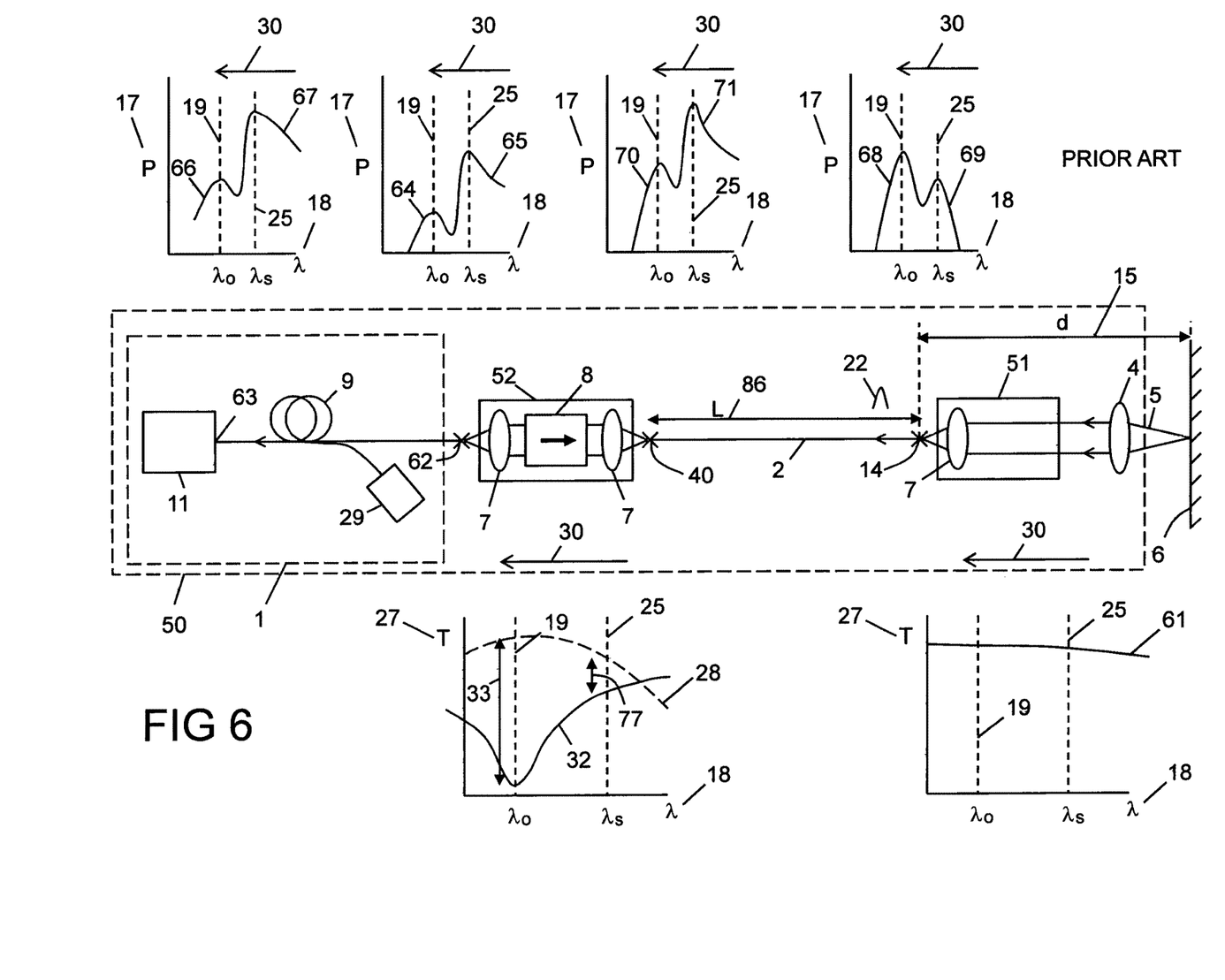
FIG. 6 shows evolution of stimulated Raman scattering in the reverse direction in the apparatus of FIG. 5.

FIG. 6 shows operation of the laser system 50 in the reverse direction 30. The optical spectrum 68 of the reflected laser radiation 31 is higher at the signal wavelength 19 than the optical spectrum 34 shown in FIG. 2 as a result of there being no optical isolator in the output optic 51. The Raman component 69 will however be a similar level to the Raman component 35, provided that there are no additional filtering components in the output optic 31 than in the output optic 3.

The Raman component 69 will then be amplified along the fibre 2 by stimulated Raman scattering. If the peak power 21 is sufficiently high, the resulting spectrum 70 at the input end 40 of the optical fibre 2 will have a substantial Raman component 71. The optical isolator 8 will attenuate the reflected laser radiation 31 at the signal wavelength 19 more than at the Raman wavelength 25, resulting in the spectrum 64 which has a substantial Raman component 65 at the Raman wavelength 25. The spectrum 64 is then amplified in the amplifying fibre 9, resulting in the spectrum 66 at the output of the seed laser 63. The spectrum 66 contains a substantial Raman component 67 which may damage the seed laser 11.

Figure 7:
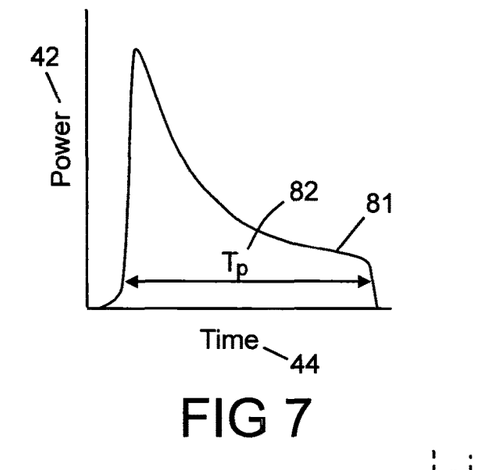
FIG. 7 shows a desired pulse shape.

The desired pulse shape 81 at the work piece 6 is shown with reference to FIG. 7. The pulse shape 81 has a pulse width 82. As before, the effect of stimulated Raman scattering is to remove signal radiation from the forward going laser radiation 5 resulting in the pulse shape 83 having a distortion 84 at the work piece 6.

Figure 8:
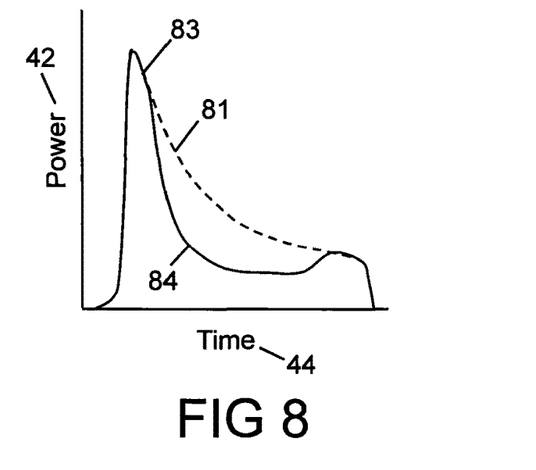
FIG. 8 shows a distortion of the desired pulse shape in the apparatus of FIG. 5.

Locating the optical isolator 8 adjacent to the laser 1 as shown in FIG. 5 can be preferable to the arrangement shown in FIG. 1 because it removes an expensive component to a location that is away from reflections from the work piece 6. This has reliability and other maintenance advantages. However, this has not been possible for many high power laser systems because removing the optical isolator 8 from the output optic 3 of FIG. 1 has the effect of removing attenuation of the reflected laser radiation 31, permitting more power to propagate in the optical fibre 2. When processing highly reflective materials such as copper and diamonds, this can approximately double the instantaneous peak power in the optical fibre 2 as the forward going laser radiation 13 is added to the backward travelling laser radiation 31 if the distance 15 is less than half of the physical length (not shown) of the laser signal 13 as it propagates along the fibre 2. Stimulated Raman scattering is a non-linear optical process, whereby the gain is related to the instantaneous peak power. Thus, in this case, the stimulated Raman scattering gain of the apparatus in FIG. 5 is twice that of the apparatus shown in FIG. 1 and thus the distortion 84 shown in FIG. 8 is substantially stronger than the corresponding effect of distortion 46 shown with reference to FIG. 4. Additionally, the Raman component 71 power in the reverse direction 30 entering the optical isolator 8 at the Raman wavelength 25 in FIG. 6 will be substantially greater than the corresponding Raman component 37 in FIG. 2, and is therefore more likely to destabilise or damage the laser 1.

The distortions 46 and 84 are very undesirable, and get worse as the peak power 21 of the laser system 10 increases or if the length 86 of the optical fibre 2 is increased. It is extremely noticeable for single mode or low-moded ytterbium doped fibre laser systems having a length 86 of the optical fibre 2 of around 2-5 m and peak powers 21 greater than 10 kW. A low-moded fibre laser can be defined by a beam quality $M^2$ factor 95 shown with respect to FIG. 9 of less than 4, and preferably less than 2. The peak power 21 must further be reduced if the length 86 is increased. The effect thus places great design limitations on peak power 21 and fibre length 86.

Figure 9:
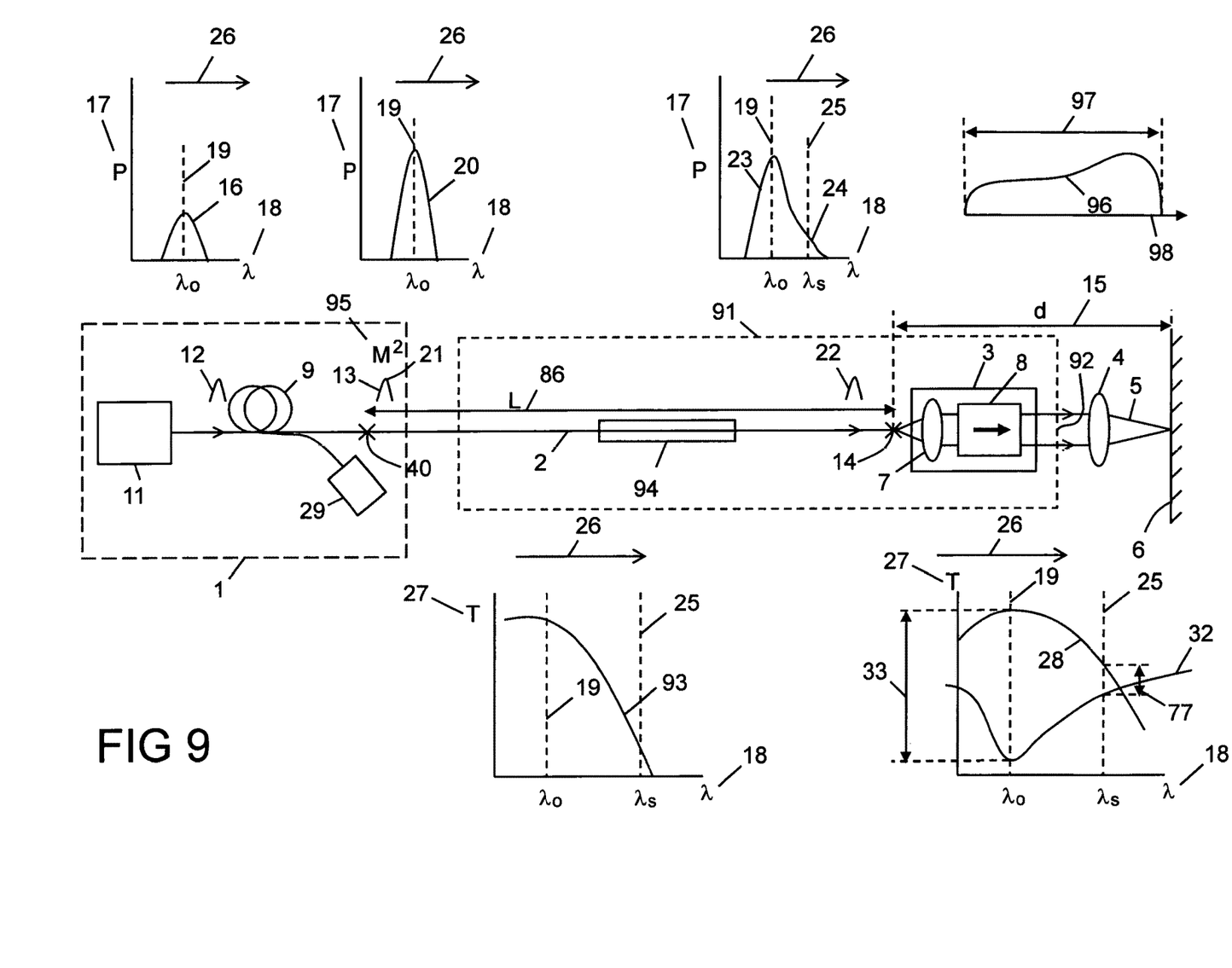
FIG. 9 shows the evolution of Raman scattering in the forward direction in an apparatus according to the present invention.
Figure 10:
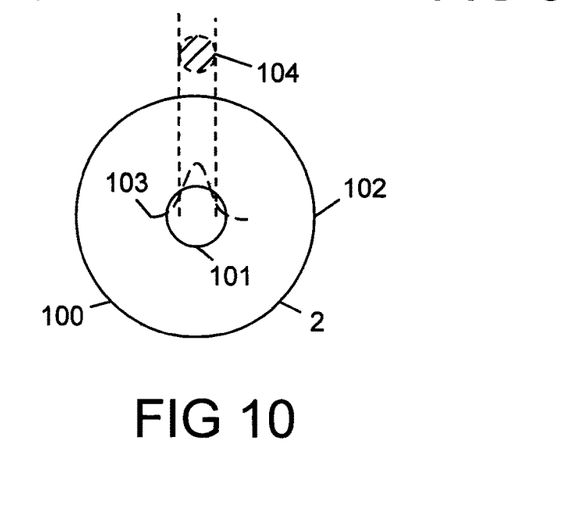
FIG. 10 shows an optical fibre.

An apparatus for optical isolation according to the invention will now be described solely by way of example and with reference to FIG. 9. Similar parts as in previous Figures have been given the same reference numbers for ease of comparison and understanding. The apparatus comprises the laser 1, a beam delivery system 91, and an output port 92, wherein:

the beam delivery system 91 comprises the optical isolator 8 and the optical fibre 2;

the laser 1 is defined by the peak power 21;

the laser 1 emits laser radiation 13 at the signal wavelength 19;

the laser radiation 13 is coupled from the laser 1 to the output port 92 via the beam delivery system 91; and the optical fibre 2, shown with reference to FIG. 10, comprises an optical waveguide 100 defined by a core 101 and a cladding 102. The optical waveguide transmits a mode 103 having a mode field area 104 at the signal wavelength 19. The optical fibre 2 has a length 86, and is further defined by the Raman wavelength 25.

The apparatus is characterised in that:

the Raman wavelength 25 is longer than the signal wavelength 19;

the beam delivery system 91 attenuates the laser radiation 13 at the signal wavelength 19 such that the power of the laser radiation 13 emitted by the laser 1 is more than the power of the laser radiation 13 at the output port 92;

the apparatus does not include a pump for pumping the laser radiation 13 at the signal wavelength 19 as the laser radiation 13 propagates along the optical fibre 2;

the optical isolator 8 has greater backward optical isolation 33 and greater forward transmission 28 at the signal wavelength 19 compared to the Raman wavelength 25; and the optical fibre 2 comprises a suppressing means 94 for suppressing stimulated Raman scattering.

The apparatus shown with reference to FIG. 9 may include the objective lens 4 configured to focus the optical radiation 5 onto the work piece 6, the apparatus being in the form of an apparatus for the industrial processing of materials. Such industrial processing may include cutting, welding, marking, engraving, scribing, cleaning, drilling, cladding, or additive manufacturing. In such an apparatus, the forward going optical radiation 5 provided by the laser 1 is often partially reflected by the work piece 6. If the forward going optical radiation 5 also includes a component at the Raman wavelength 25, then the effect of the reflected radiation 31 shown with reference to FIG. 11 either at the signal wavelength 19 or the Raman wavelength 25 is to remove signal radiation from the forward going laser radiation 5 resulting in the pulse shape having a distortion at the work piece 6 as described previously with reference to FIGS. 4 and 8. The reflected radiation 31 may also cause damage to the laser 1 or the beam delivery system 91.

The suppressing means 94 has the effect of reducing the transmission 93 of the optical fibre 2 at the Raman wavelength 25 compared to the signal wavelength 19. Thus the forward going Raman component 24 at the output end 14 of the optical fibre 2 in the apparatus of FIG. 9 has a lower value compared to the forward going Raman component 24 in the apparatus of FIG. 1. Similarly, the spectrum 34 of the reflected laser radiation 31, shown with reference to FIG. 11, has a smaller Raman component 35 at the Raman wavelength 25 than the spectrum 34 shown with reference to FIG. 2. The suppressing means 94 will further filter the Raman component 35 of the reflected optical radiation 31 as it propagates back towards the laser 1, leading to reduced Raman components 37 and 39 of the spectra 36 and 38 compared to the system shown in FIG. 2.

Figure 12:
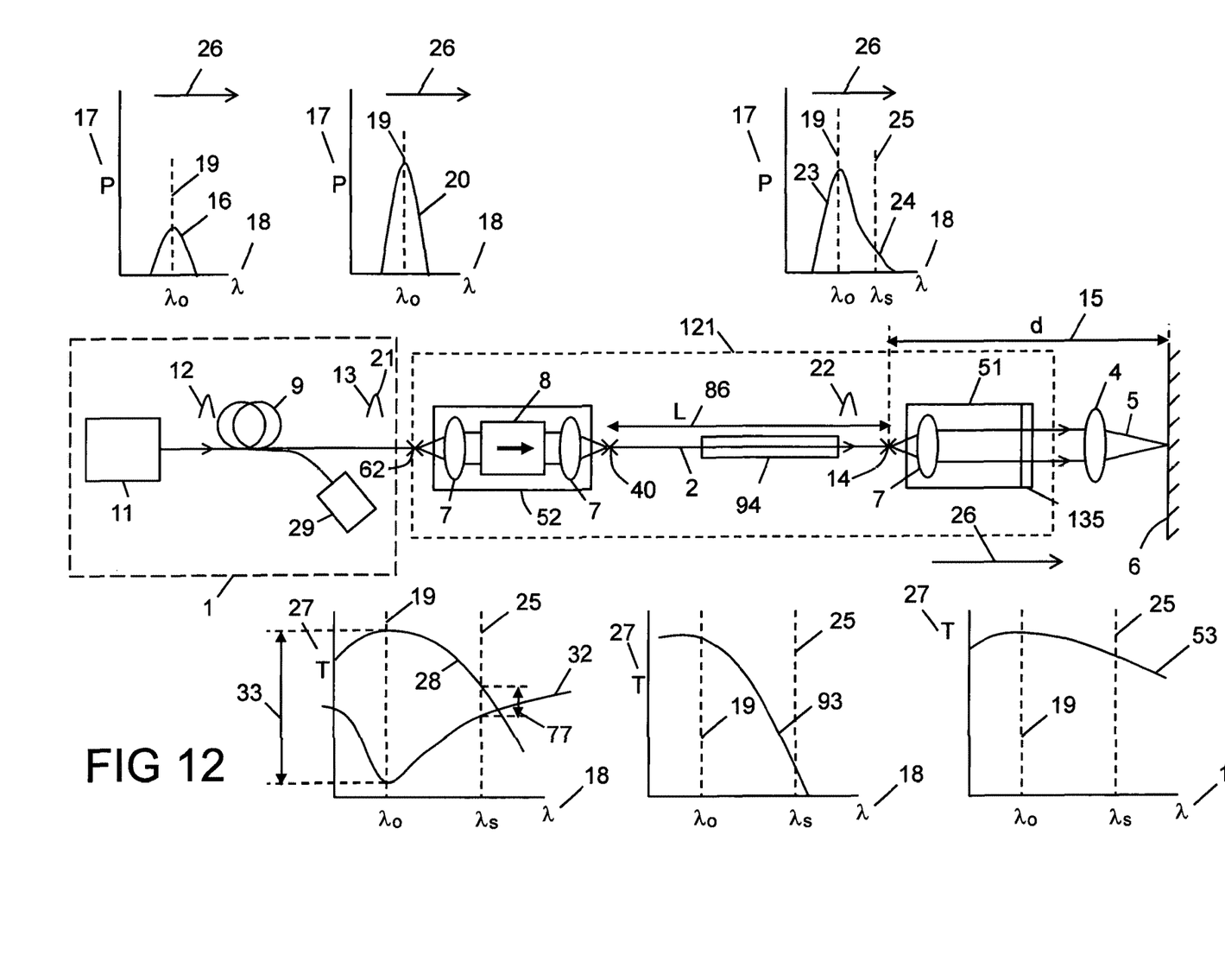
FIG. 12 shows the evolution of Raman scattering in the forward direction in an apparatus of the present invention and in which the optical isolator is located between the laser and the optical fibre.

FIG. 12 shows a filter 135 that can be included in the beam delivery system 121 to filter the Raman component 24. The filter 135 can be a dielectric filter that attenuates optical radiation. The filter 135 can also be included in the beam delivery system 91 of FIG. 9.

Figure 13:
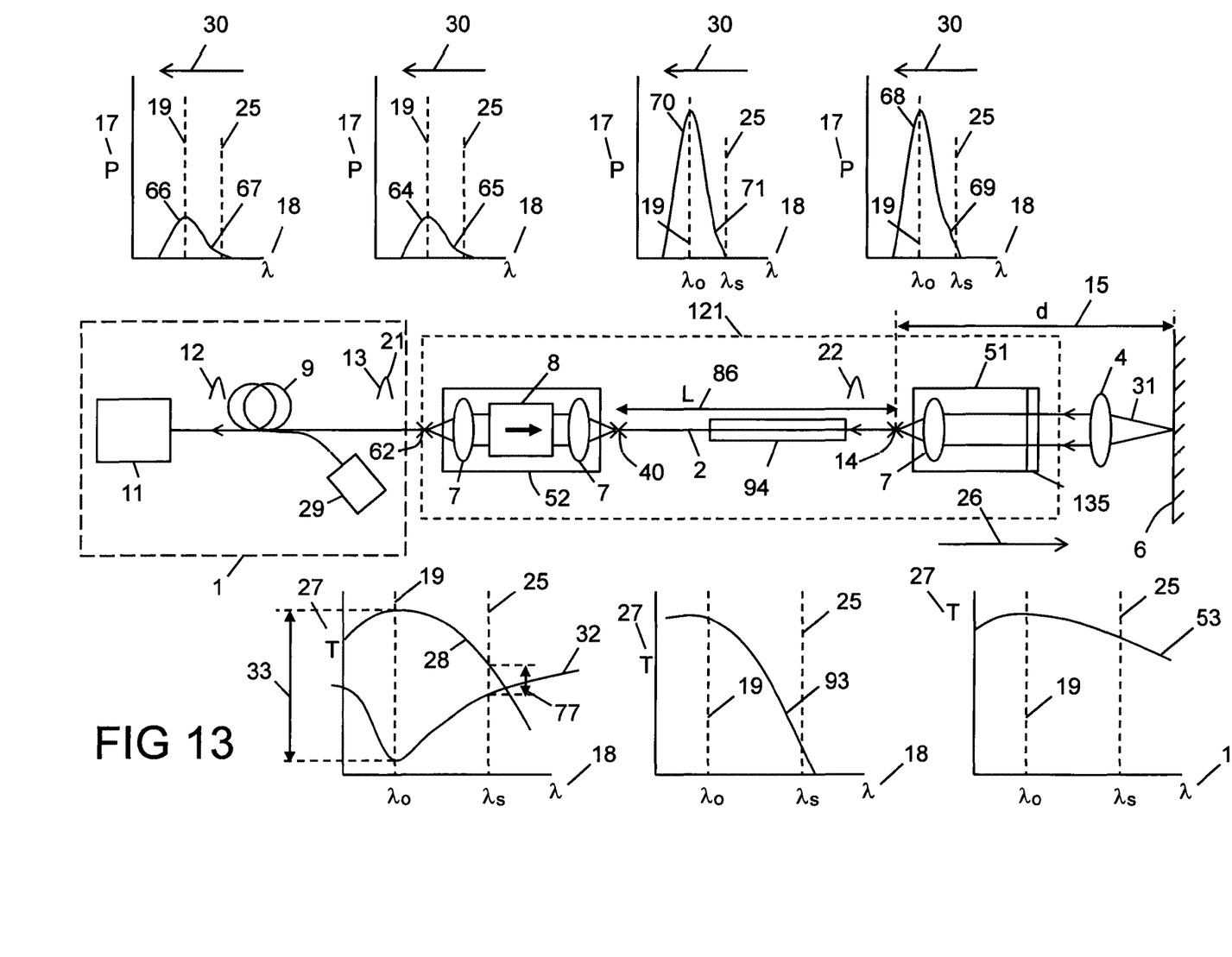
FIG. 13 shows the evolution of Raman scattering in the reverse direction in the apparatus of FIG. 12.

The optical isolator 8 can be positioned between the laser 1 and the optical fibre 2 as shown in FIGS. 12 and 13. The beam delivery system 91 of FIG. 9 has been replaced by the beam delivery system 121. This is similar to the system shown in FIGS. 5 and 6, save that the optical fibre 2 comprises the suppressing means 94. The effect of the stimulated Raman scattering suppressing means 94 is to reduce the Raman component 24 of the spectrum 23 at the output end 14 for both forward going laser radiation 5 and the reflected laser radiation 31. The Raman component 69 shown in FIG. 13 is further suppressed as it propagates along the optical fibre 2 towards the optical isolator 8. The Raman components 71, 65 and 67 of the apparatus shown in FIGS. 12 and 13 are consequently smaller than the equivalent Raman components of the apparatus shown in FIGS. 5 and 6.

Figure 11:
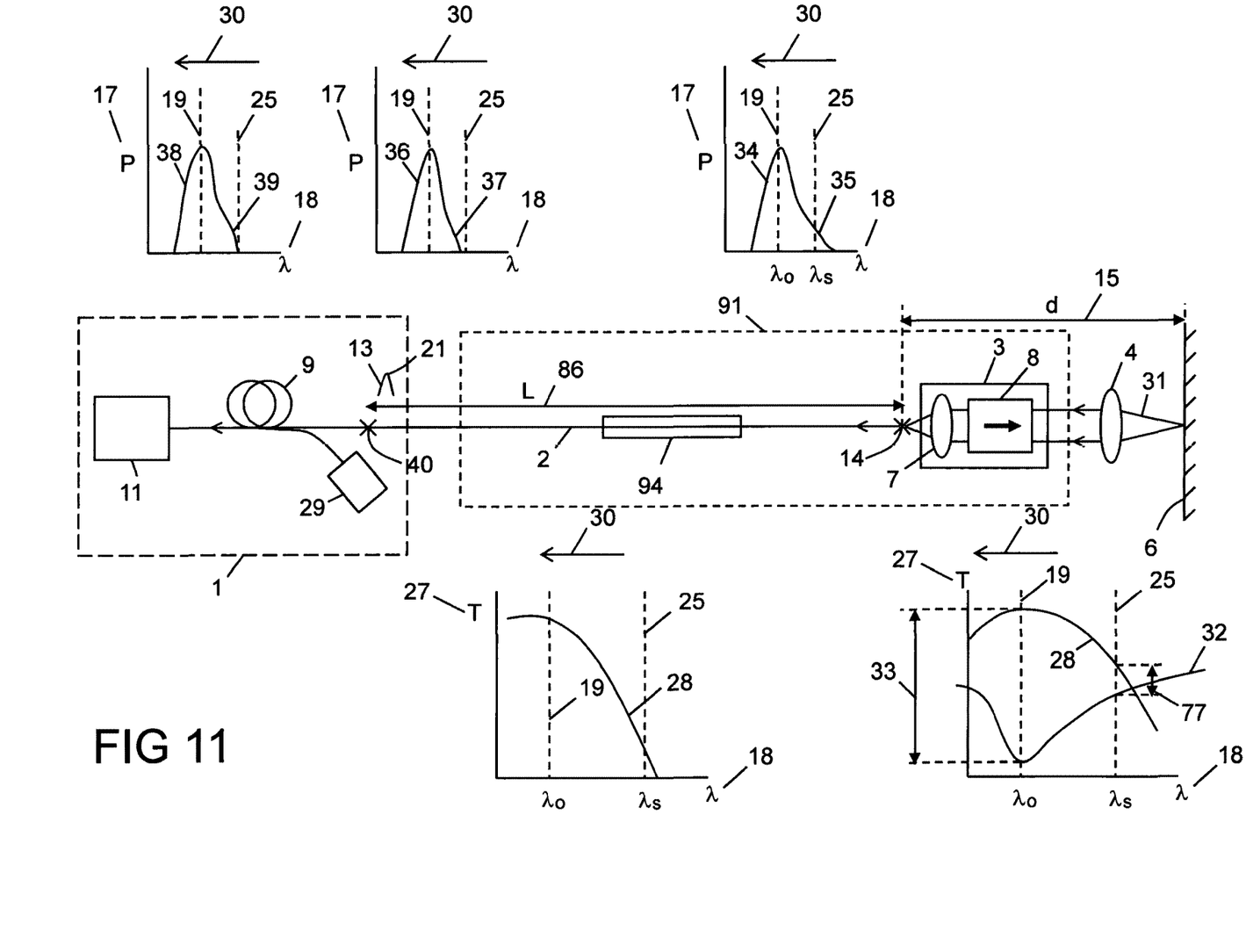
FIG. 11 shows the evolution of stimulated Raman scattering in the reverse direction in the apparatus of FIG. 9.

The apparatus of FIGS. 12 and 13 has a similar function to the arrangement shown in FIGS. 9 and 11 because the non-linear effect of stimulated Raman scattering has been mitigated in both cases. However, the arrangement of FIGS. 12 and 13 is particularly advantageous because:

(i) The output optic 3 shown in FIG. 9 contains the optical isolator 8. As a direct consequence, it is often large and heavy compared to the output optic 51 of FIG. 12 that does not contain the optical isolator 8. The output optic 3 can be cumbersome to install in laser material processing machines.

(ii) The optical isolator 8 contained in the output optic 3 of FIG. 9 will substantially contain the reflected laser radiation 31, and prevent it from entering back into the fibre 2. The output optic 3 may therefore require active cooling when used with high average power lasers (greater than 20 W) or highly reflective materials (greater than 80%). The cooling of the output optic 3 may require cooling means which may be undesirably large, noisy and dirty if achieved using forced-air cooling, or may introduce water pipes and chillers to the laser machine if achieved using water cooling. In the arrangement shown in FIG. 12, the optical isolator 8 may be mounted in the chassis of the laser 1 which will already include cooling to dissipate heat and can easily be modified to manage the thermal heat generated from reflected laser radiation 31 that is contained within the optical isolator housing 52. The system of FIG. 12 is advantageous because virtually all of the cooling requirement can be managed at the laser chassis, away from the work piece 6.

The laser 1 may emit laser radiation 13 that is polarized. The optical isolator 8 may be a polarization dependent isolator.

The laser 1 may emit laser radiation 13 that is randomly polarized. The optical isolator 8 may be a polarization independent isolator.

Figure 14:
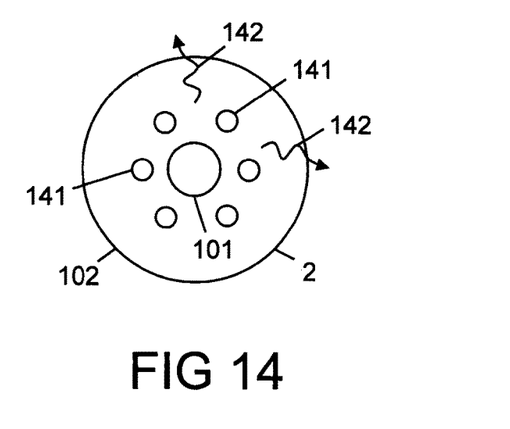
FIG. 14 shows a suppressing means for suppressing stimulated Raman scattering in the form of an optical fibre having high refractive index features.

The suppressing means 94 may comprise high refractive index features 141 adjacent to the core 101, as shown in FIG. 14. By high refractive index features, it is meant that the refractive index of these features 141 is higher than a refractive index of the cladding 102. Preferably the refractive index is higher than a refractive index of the core 101. The high refractive index features 141 are designed to couple optical radiation propagating at the Raman wavelength 25 from the core 101 into leaky modes 142. Preferably, the coupling at the Raman wavelength 25 is much stronger than the coupling at the signal wavelength 19. The suppressing means 94 can be used to remove unwanted optical radiation propagating in both the fundamental mode as well as higher order modes. It is therefore useful for a laser 1 where the beam quality $M^2$ factor 95, shown with reference to FIG. 9, that is less than 1.3, between 1.3 and 2, preferably between 2 and 7, and more preferably between 7 and 15. It is also useful for a laser 1 having a beam quality $M^2$ factor 95 greater than 15.

Figure 15:
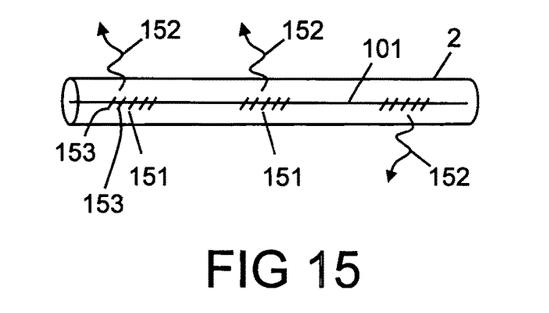
FIG. 15 shows a suppressing means in the form of at least one blazed grating.

As shown in FIG. 15, the suppressing means 94 may comprise one or more blazed gratings 151 designed to couple optical radiation 152 at the Raman wavelength 25 out of the core 101. Blazed gratings have a plurality of grating lines 153 at a non-perpendicular angle to the axis of the fibre 2 as shown in FIG. 15.

Figure 16:
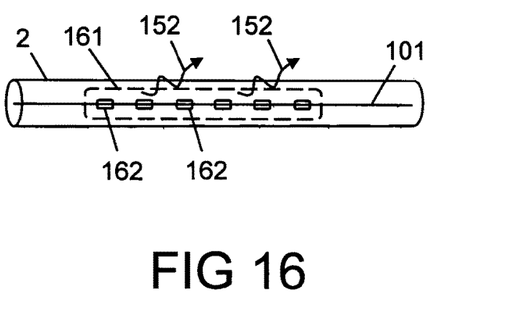
FIG. 16 shows a suppressing means in the form of at least one long period grating.

The suppressing means 94 may comprise one or more long period gratings 161, as shown in FIG. 16, designed to couple optical radiation 152 at the Raman wavelength 25 out of the core 101. Long period gratings comprise a plurality of refractive index modifying features 167 along the core 101 of the optical fibre 2. The coupling can be between core guided modes (not shown) and leaky modes (not shown), or between core guided modes and guided modes of another waveguide (not shown) with the optical fibre 2.

Figure 17:
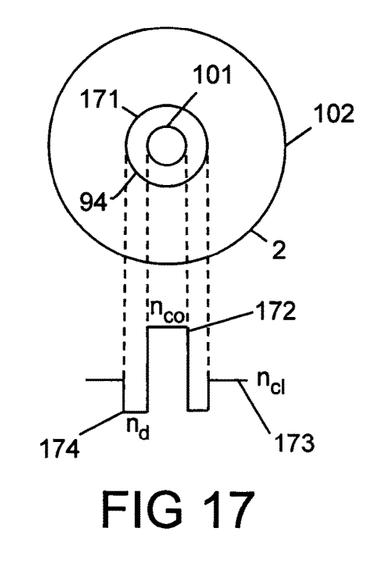
FIG. 17 shows a suppressing means in the form of a fibre having depressed refractive index cladding adjacent to the core.
Figure 18:
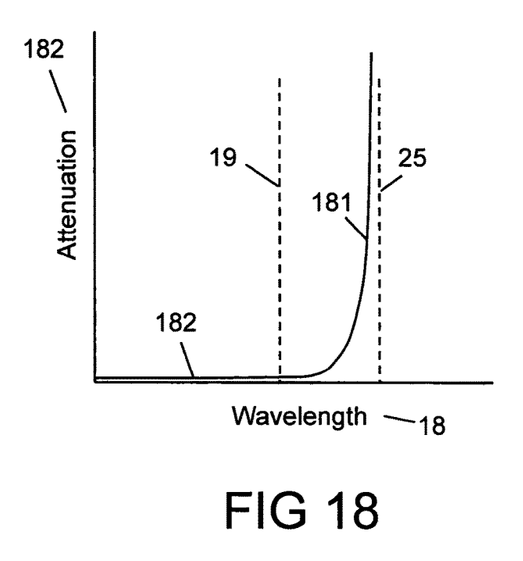
FIG. 18 shows a bend edge in the fibre of FIG. 17.

The suppressing means 94 may comprise a depressed refractive index cladding 171 adjacent to, or surrounding the core 101, as shown in FIG. 17. The core 101 has a refractive index 172 that is greater than a refractive index 173 of the cladding 102. The refractive index 174 of the depressed refractive index cladding 171 is less than the refractive index 173 of the cladding 102. FIG. 18 shows the optical attenuation 182 as a function of wavelength 18. The fibre 2 can be designed to have a sharp bend edge 181 such the attenuation 182 at the Raman wavelength 25 is substantially higher than the attenuation 182 at the signal wavelength 19. The stability of the bend edge 182 can be enhanced by arranging for the optical fibre 2 to be spiraled when cabled, for example, by wrapping around a central member.

It is preferred that the suppressing means 94 is distributed along the optical fibre 2, such as in the arrangements shown in FIGS. 14 and 17.

The arrangements shown in FIGS. 14 to 17 are suitable for suppressing stimulated Raman scattering in the fundamental mode of the optical fibre 2. The arrangement shown in FIG. 14 can also be configured to suppress the stimulated Raman scattering in higher order modes of the optical fibre 2, which is advantageous for higher power laser systems, and especially advantageous for multiple transverse mode pulsed fibre laser systems.

The suppressing means 94 enables the peak power 21 of the laser radiation 5 to be substantially increased without causing damage or instability to the laser 1. Alternatively, or additionally, the suppressing means 94 enables the length 86 of the optical fibre 2 to be increased. The laser 1 can be a pulsed laser and the peak power 21 may be at least 1,000 times its average power. The peak power 21 may be 10 to 10,000 times its average power. The laser 1 can be nanosecond, picosecond or femtosecond laser, and the peak power 21 may be 1,000 to 1,000,000 times its average power. For example, if the peak power 21 is denoted by $P_p$, and the mode field area 104 by $A_{eff}$, then the invention enables the length 86 denoted by L to be greater than a critical length $L_c$ (not shown) given by:

$$L_c = \frac{16 \cdot A_{eff}}{g_R \cdot P_p}$$

where $g_R$ is the Raman gain coefficient of the optical fibre 2. For example, the critical length $L_c$=0.75 m for a single-mode fibre with a mode area 104 $A_{eff}$=150 um² and a peak power $P_p$=10 kW. The length 86 can be at least 1.5 times the critical length $L_c$. Preferably, the length 86 is at least 2 times the critical length $L_C$. More preferably, the length 86 is at least five or ten times the critical length $L_c$.

The laser 1 described with reference to FIGS. 1, 2, 5, 6, 9 and 11-13 and in the discussion relating to the critical length $L_c$ is a master oscillator power amplifier. A master oscillator power amplifier is preferred because the pulse parameters of pulses emitted by the laser 1, such as pulse shape, peak power, and pulse repetition rate, can be controlled by controlling the drive signals to the master oscillator and to the power amplifier. However, the laser 1 may also be, for example, a Q-switched laser, a mode locked laser, or a continuous wave laser. If the laser is a continuous wave laser, then the peak power 21 is the maximum laser power that can be emitted by the laser 1. The laser 1 may also be, for example, a fibre laser, a solid state laser such as a rod laser or a disc laser, or a gas laser. Additional filtering at the Raman wavelength 25 can be incorporated into the apparatus described with reference to FIGS. 9 and 12.

FIG. 9 shows the output power of a pulse 96 of the optical radiation 5 as a function of distance 98. If the spatial pulse length 97 in vacuum is greater than 2 d (that is twice the distance 15 from the end 14 of the optical fibre 2 to the work piece 6) then the reflected optical radiation 31 will at least partially overlap the forward going optical radiation 5 in the optical fibre 2. This overlap can result in stimulated Raman scattering. Advantageously, incorporation of the suppressing means 94 permits the reflected optical radiation 31 to overlap the forward going optical radiation 5 without the distortion or destabilising effects caused by stimulated Raman scattering at higher peak powers 21 or longer lengths 86 than would otherwise be the case. Advantageously, the suppressing means 94 helps to suppress the resulting stimulated Raman scattering that can occur with combinations of peak power 21 and length 86. It is therefore possible to increase one or both of the peak power 21 and the length 86 in the apparatus described with reference to FIGS. 9 and 12 without the distortion or destabilising effects caused by stimulated Raman scattering. The pulse width may be at least 100 ps. The pulse width may be at least 1 ns.

Referring again to FIG. 9, the spatial length 99 (not shown) of the optical pulse 96 within the optical fibre 2 is reduced by the refractive index of the optical fibre 2. In silica fibres, the spatial length 99 is approximately equal to the spatial length 96 divided by 1.5. The laser 1 may be configured to emit a pulse 21 that has a spatial length 99 of between two times and ten times the length L 86 of the optical fibre 2. The spatial length 99 may be less than five times the length 86 of the optical fibre 2. The spatial length 99 may be less than two times the length 86 of the optical fibre 2. A pulse 21 having a spatial length 99 of at least twice the length 86 of the optical fibre 2 will overlap in the optical fibre 2 completely at least once during a reflection from the fibre end 14. In practice the effects of pulse distortion caused by overlapping pulses becomes important for pulses 21 having spatial pulse lengths 99 up to approximately 10 L The laser 1 may emit a pulse 21 that has a spatial pulse length 99 less than 10 L, preferably less than 5 L, and more preferably less than 2 L. Advantageously, incorporation of the suppressing means 94 permits the reflected optical radiation 31 to overlap the forward going optical radiation 5 without the distortion or destabilising effects caused by stimulated Raman scattering at higher peak powers 21 or longer lengths 86 than would otherwise be the case. It is therefore possible to increase one or both of the peak power 21 and the length 86 in the apparatus described with reference to FIGS. 9 and 12 without the distortion or destabilising effects caused by stimulated Raman scattering.

The laser 1 may be able to emit a pulse 21 having a pulse width less than or equal to 2 μs. The pulse width may be less than or equal to 500 ns. The pulse width may be less than or equal to 100 ns. The pulse width may be less than or equal to 25 ns.

The laser may be configured to emit a plurality of the pulses 21, and the spatial separation (not shown) in the optical fibre 2 between adjacent pulses 21 may be less than or equal to twice the length 86 of the optical fibre 2. Advantageously, incorporation of the suppressing means 94 permits the reflected optical radiation 31 to overlap the forward going optical radiation 5 without the distortion or destabilising effects caused by stimulated Raman scattering at higher peak powers 21 or longer lengths 86 than would otherwise be the case. It is therefore possible to increase one or both of the peak power 21 and the length 86 in the apparatus described with reference to FIGS. 9 and 12 without the distortion or destabilising effects caused by stimulated Raman scattering. The laser 1 may have a pulse repetition frequency of at least 1 MHz, preferably at least 5 MHz, and more preferably at least 20 MHz.

The laser 1 is preferably a fibre laser. The fibre laser is preferably configured as a master oscillator power amplifier. The laser 1 may be a multimode laser or a single mode laser. The laser 1 preferably emits optical radiation in the fundamental mode. The laser 1 is preferably a pulsed fibre laser comprising a rare earth doped fibre in which energy is stored between emitted pulses. More preferably, the laser 1 is a ytterbium-doped fibre laser defined by a beam quality $M^2$ factor 95 less than 2 and a peak power greater 21 than 10 kW. Other ranges of beam quality $M^2$ factor 95 are also useful as described with reference to FIG. 14. The laser is preferably configured as a master oscillator power amplifier. Such a laser is an important component of material processing systems, and the present invention is particularly advantageous because it prevents back reflected optical radiation from reaching the rare earth doped fibre in a manner that would destabilized the laser or cause damage to the laser. If the laser is destabilized then the material processing system would be adversely affected.

It is to be appreciated that the embodiments of the invention described above with reference to the accompanying drawings have been given by way of example only and that modifications and additional steps and components may be provided to enhance performance. Individual components shown in the drawings are not limited to use in their drawings and may be used in other drawings and in all aspects of the invention. The present invention extends to the above mentioned features taken singly or in any combination.

The invention claimed is:

1. Apparatus for the industrial processing of materials, which apparatus comprises a laser, a beam delivery system, an output port, and an objective lens, wherein:
   the beam delivery system comprises an optical isolator and an optical fibre;
   the laser is defined by a peak power;
   the laser emits laser radiation at a signal wavelength;
   the laser radiation is coupled from the laser to the output port via the beam delivery system;
   the objective lens is configured to focus the laser radiation onto a work piece;
   an output end of the optical fibre is a distance d from the work piece;
   the optical fibre comprises an optical waveguide defined by a core, a cladding, a mode field area at the signal wavelength, a length, a Raman gain coefficient, and a Raman wavelength;
   the Raman wavelength is longer than the signal wavelength;
   the beam delivery system attenuates the laser radiation at the signal wavelength such that the power of the laser radiation emitted by the laser is more than the power of the laser radiation at the output port;
   the apparatus does not include a pump for pumping the laser radiation at the signal wavelength as the laser radiation propagates along the optical fibre;
   the optical isolator has greater backward optical isolation and greater forward transmission at the signal wavelength compared to the Raman wavelength;
   the length of the optical fibre is defined by:

$$L > 16 \cdot A_{\it eff}/(g_R \cdot P_p)$$

wherein L is the length of the optical fibre, $A_{\it eff}$ is the mode field area, $g_R$ is the Raman gain coefficient, and $P_p$ is the peak power;
   the laser is such that it emits a pulse having a spatial length in vacuum greater than 2d; and
   the optical fibre comprises a suppressing means for suppressing stimulated Raman scattering;
   whereby incorporation of the suppressing means permits optical radiation reflected from the work piece to overlap the forward going optical radiation without the distortion or destabilising effects caused by stimulated Raman scattering.

2. Apparatus according to claim 1 wherein the suppressing means is distributed over the length of the optical fibre.

3. Apparatus according to claim 1 wherein the suppressing means comprises high refractive index features which surround the core and which are configured to increase coupling of light into leaky modes at the Raman wavelength compared to coupling of light into leaky modes at the signal wavelength.

4. Apparatus according to claim 3 wherein the suppressing means is configured to suppress stimulated Raman scattering in higher order modes of the optical fibre.

5. Apparatus according to claim 1 wherein the suppressing means comprises at least one blazed grating.

6. Apparatus according to claim 1 wherein the suppressing means comprises at least one long-period grating.

7. Apparatus according to claim 1 wherein the suppressing means comprises a depressed refractive index region surrounding the core.

8. Apparatus according to claim 1 wherein the optical isolator is located between the laser and the optical fibre.

9. Apparatus according to claim 1 wherein the optical fibre is located between the laser and the optical isolator.

10. Apparatus according to claim 1 wherein the laser is configured to emit a pulse that has a spatial length in the optical fibre of between two times and ten times the length of the optical fibre.

11. Apparatus according to claim 1 wherein the spatial length is less than five times the length of the optical fibre.

12. Apparatus according to claim 11 wherein the spatial length is less than two times the length of the optical fibre.

13. Apparatus according to claim 1 wherein the laser is configured to emit a plurality of pulses, and the spatial separation in the optical fibre between adjacent pulses is less than or equal to twice the length of the optical fibre.

14. Apparatus according to claim 1 wherein the laser is a ytterbium-doped fibre laser defined by a beam quality $M^2$ factor less than 2 and a peak power greater than 10 kW.

15. Apparatus according to claim 1 wherein the laser is configured as a master oscillator power amplifier.

16. A method for the industrial processing of materials, which method comprises providing a laser, a beam delivery system, an output port and an objective lens, wherein:
   the beam delivery system comprises an optical isolator and an optical fibre;
   the laser is defined by a peak power;
   the laser emits laser radiation at a signal wavelength;
   coupling the laser radiation from the laser to the output port is via the beam delivery system;
   the laser radiation is focussed onto a work piece located a distance d from an output end of the optical fibre;
   the optical fibre comprises an optical waveguide defined by a core, a cladding, a mode field area at the signal wavelength, a length, a Raman gain coefficient, and a Raman wavelength;
   the Raman wavelength is longer than the signal wavelength;
   the beam delivery system attenuates the laser radiation at the signal wavelength such that the power of the laser radiation emitted by the laser is more than the power of the laser radiation at the output port;
   the apparatus does not include a pump for pumping the laser radiation at the signal wavelength as the laser radiation propagates along the optical fibre;
   the optical isolator has greater backward optical isolation and greater forward transmission at the signal wavelength compared to the Raman wavelength;
   the length of the optical fibre is defined by:

$$L > 16 \cdot A_{\it eff}/(g_R \cdot P_p)$$

wherein L is the length of the optical fibre, $A_{\it eff}$ is the mode field area, $g_R$ is the Raman gain coefficient, and $P_p$ is the peak power;
   causing the laser to emit a pulse having a spatial length in vacuum greater than 2d; and the optical fibre comprises a suppressing means for suppressing stimulated Raman scattering;
whereby incorporation of the suppressing means permits optical radiation reflected from the work piece to overlap the forward going optical radiation without the distortion or destabilising effects caused by stimulated Raman scattering.

* * * * *